Patented Oct. 25, 1927.

1,646,842

UNITED STATES PATENT OFFICE.

CHARLES A. WHITING, OF FRANKLIN, MASSACHUSETTS, ASSIGNOR TO WHITING & DAVIS COMPANY, A CORPORATION OF MASSACHUSETTS.

METHOD OF MAKING INTERMESHING LINKS.

No Drawing.  Application filed December 3, 1924.  Serial No. 753,754.

This invention relates to the manufacture of link mesh, and its object is to provide an improved method of manufacture of mesh of the type in which the ends of the pieces of wire from which the links are made are soldered together, the distinguishing characteristic of the method being that it permits of the manufacture of soldered mesh without requiring the use of wire having a solder core.

The invention relates more particularly to the method of making mesh disclosed in Patent No. 1,484,979, granted to me February 26, 1924, and is directed especially to improving and perfecting that method to make it more available for use in the manufacture of mesh in quantity at low cost. In accordance with that patent the wire of the links of a piece of mesh is coated, preferably by electro-deposition, with a metal having a melting point lower than that of the wire, and the mesh is then subjected to heat sufficient to soften the metal of this coating, whereupon some of the coating metal runs into the joints of the rings; then on cooling, the coating metal hardens in the joints of the rings, welding together the ends of the pieces of wire from which the rings are formed, increasing the strength of the mesh, and improving its appearance.

This method is of special value when the mesh is made of base or semi-precious metal and plated with precious metal for then the plating of the precious metal may be employed, modifying its composition if necessary, in filling and soldering the joints as above set forth.

When employing this method it is important to guard against the welding together of links of the mesh as might result when two links are in contact while the coating metal thereof is softened. I have found that this can be done readily and quite effectively by applying to a piece of mesh a coating of charcoal or graphite or similar material after the coating metal has been plated upon the mesh and prior to the heating operation. When this is done and thereafter the mesh is heated, the coating metal is softened and enough of it runs out from under the graphite coating and into the joint to fill the joint and effect the welding of the links. The method of the present invention, therefore, includes the application of some such material as graphite or charcoal in a state of fine pulverization to the mesh after the coating metal has been applied to the mesh and prior to the heating operation. This material does not pass into the joints of the links but its presence upon the exterior surfaces of the links protects them quite thoroughly and does not limit or retard the soldering operation to any appreciable extent.

In the practice of the invention, the mesh is first thoroughly cleaned. For this purpose it is preferably boiled in a suitable cleaning solution and an electric current is passed through it and thereafter it is washed. After this thorough cleaning it is ready to receive the coating metal.

In some instances, as for instance when the mesh is to be plated with silver, it is desirable to give the mesh an initial plating of copper, this being merely a flash deposit accomplished in a very short period of time. Then the mesh is again washed and is put into the silver plating tank where the outer coating is deposited upon it. This plating operation may extend over an hour or more. Usually a plating of silver is employed as such a coating gives the mesh a beautiful appearance and also it adapts itself to soldering the mesh in accordance with the method above outlined.

After the metal coating has been applied to the mesh, the latter is washed and a flux is applied to it as by placing it in a borax wash solution and boiling it. Following the application of the flux the mesh is dried.

Next the graphite or charcoal is applied to the mesh, it being caused to adhere to the mesh in a thin film covering the entire surface of all of the links.

Then the mesh so coated and prepared for the heat treatment is put into a furnace in a temperature of approximately 1700° F. and is kept there for a period approximating 30 seconds, the time varying with the composition and thickness of the coating metal and other factors. The application of this heat over this brief period of time suffices to soften the coating metal and some of it at the joints of the links flows out under the graphite coating and into the joint, enough of it to fill the joint, and on cooling, this coating metal in the joints hardens, welding the ends of the rings together to give to the mesh the strength and attractive appearance which are characteristic of soldered mesh.

The temperature prevailing in the furnace and the time during which the mesh remains in the furnace are items of considerable importance as the coating metal must be sufficiently softened to cause that amount of flow which will result in filling the joints in the rings, but the softening of the coating metal must not extend beyond the point necessary for effecting this purpose.

The proper conditions for the conduct of the heat treatment can be determined by experiment for various kinds of mesh differing as to size, diameter of the wire employed, thickness of the coating metal thereon, etc., based upon the statement above given that good results have been obtained when the mesh is allowed to remain in the furnace 30 seconds and the temperature in the furnace is maintained at 1700° F.

After the heat treatment, the protective coating of graphite or charcoal is removed and the mesh cleaned and polished in any convenient manner, and it may then be used for the manufacture of mesh bags just as mesh made from solder core wire is used.

I have described the method constituting my invention as involving application of the metal coating to the wire after the mesh has been formed, but it is to be understood that if desired the coating may be applied to the wire before the latter is cut and bent to form rings and meshed with the rings of the piece of mesh.

I claim:

1. The process of producing link mesh which consists in making mesh of solid wire, applying to the wire a film of metal forming the surface finish of the wire, applying a flux, applying over the wire coated with the flux a protective coating of finely pulverized material, and thereafter subjecting the mesh to a high temperature for a short period of time and thereby softening the metal coating upon the links to an extent sufficient to permit some of the metal coating to run into the joints of the links to fill these joints and, on cooling, to weld the ends of the links together.

2. The process of making mesh which consists in cleaning a piece of unsoldered mesh, electrodepositing upon the mesh a coating of a precious metal suitable to form the surface plating of the finished mesh and having a lower melting point than the metal of which the links are made, applying a flux to the mesh, covering the mesh with a protective coating of a finely pulverized material resistant to heat, and subjecting the mesh to a high temperature for a short time, this heat treatment being sufficient to soften the metal of the electroplated coating, whereby some of the metal of the coating flows into the joints of the links and fills them, while the rest of the coating serves as the outer layer of the finished mesh.

In testimony whereof I affix my signature.

CHARLES A. WHITING.